United States Patent
Bischoff et al.

(10) Patent No.: US 11,201,534 B2
(45) Date of Patent: Dec. 14, 2021

(54) SEGMENTED SECONDARY PART FOR A LINEAR MOTOR

(71) Applicant: ETEL S.A., Môtiers (CH)

(72) Inventors: Pierre Alexandre Bischoff, Mont la ville (CH); Loïc Moreno, Guyans-Vennes (FR); Sylwia Szczukiewicz, Colombier (CH); Valerio Tamellini, Neuchatel (CH)

(73) Assignee: ETEL S.A., Môtiers (CH)

( * ) Notice: Subject to any disclaimer, the term of this patent is extended or adjusted under 35 U.S.C. 154(b) by 233 days.

(21) Appl. No.: 16/574,563

(22) Filed: Sep. 18, 2019

(65) Prior Publication Data

US 2020/0099284 A1 Mar. 26, 2020

(30) Foreign Application Priority Data

Sep. 20, 2018 (EP) .................... 18195710

(51) Int. Cl.
*H02K 41/03* (2006.01)
*H02K 11/01* (2016.01)

(52) U.S. Cl.
CPC ......... *H02K 41/031* (2013.01); *H02K 11/014* (2020.08); *H02K 2201/15* (2013.01)

(58) Field of Classification Search
CPC ...... H02K 41/03; H02K 11/01; H02K 11/014; H02K 41/031; H02K 3/47; H02K 2213/12; H02K 2213/03; H02K 2201/15; H02K 5/20; H02K 9/22; H02K 9/19
See application file for complete search history.

(56) References Cited

U.S. PATENT DOCUMENTS

| 6,093,984 A * | 7/2000 | Shiga ................ H02K 1/2786 |
| | | 310/26 |
| 6,160,327 A * | 12/2000 | Wang .................. H02K 3/26 |
| | | 310/12.02 |
| 2006/0016366 A1* | 1/2006 | Feix .................. E01B 25/32 |
| | | 104/286 |
| 2008/0157619 A1* | 7/2008 | Wu .................... H02K 29/03 |
| | | 310/156.48 |
| 2010/0171375 A1* | 7/2010 | Shiao ................. H02K 41/03 |
| | | 310/12.33 |
| 2015/0028699 A1 | 1/2015 | Hofstetter et al. |

FOREIGN PATENT DOCUMENTS

| DE | 202012008675 U1 | 10/2012 |
| EP | 2774252 B1 | 9/2014 |
| KR | 2011/0027313 A | 3/2011 |
| WO | WO 2004/053270 A1 | 6/2004 |
| WO | WO 2008/148305 A1 | 12/2008 |
| WO | WO 2009/130645 A2 | 10/2009 |

* cited by examiner

*Primary Examiner* — Tran N Nguyen
*Assistant Examiner* — Leda T Pham
(74) *Attorney, Agent, or Firm* — Carter, DeLuca & Farrell LLP

(57) ABSTRACT

A segmented secondary part of a linear motor includes at least two segments, each having a plurality of magnets attached to a yoke plate, having alternating polarity, and having a direction of magnetization perpendicular to the yoke plate. The yoke plates include an overlapping region, in which the yoke plates of adjacent segments are superposed in the direction of magnetization but do not touch each other in the overlapping region.

19 Claims, 2 Drawing Sheets

SEGMENTED SECONDARY PART FOR A LINEAR MOTOR

CROSS-REFERENCE TO RELATED APPLICATIONS

The present application claims priority to Application No. 18195710.1, filed in the European Patent Office on Sep. 20, 2018, which is expressly incorporated herein in its entirety by reference thereto.

FIELD OF THE INVENTION

The present invention relates to a segmented secondary part for a linear motor. The secondary part includes a screen, by which the leakage flux in the surrounding area of the secondary is reduced.

BACKGROUND INFORMATION

Linear motors having an active primary part provided with coils and a passive secondary part provided with magnets are used as drive units in the area of exact positioning of machine elements. In this context, the primary parts may include an iron core having teeth that support coils, or they may be constructed without iron. Such ironless linear motors are considered advantageous for particularly exact positioning, since they produce considerably less cogging thrust and no attractive forces between the primary part and the secondary part.

As in the case of all electromagnetic devices, such linear motors may generate unwanted stray magnetic fields, which have a particularly disruptive effect, e.g., in the area of electron microscopy or electron-beam lithography, since such stray fields may deflect the electrons or, in general, beams of charged particles.

U.S. Patent Application Publication No. 2010/0171375 describes an ironless, linear motor, in which on both sides of a moving primary part, secondary parts, each having a yoke plate and magnets attached to it, are situated. The magnets have alternating polarity in the direction of movement of the linear motor; magnets positioned oppositely to each other are perpendicular to the yoke plates and, in each instance, magnetized in the same direction. Different measures for reducing stray fields are proposed in this document, such as end-face cover plates and flexible, magnetically shielding, sealing sheets, which only unseal the interior of the stator, where the moving primary is currently situated. However, it is very expensive to manufacture such a linear motor in any and, in particular, long lengths, since many secondary parts of different lengths and, in particular, very long secondary parts, as well, must be produced.

A linear motor, whose secondary part is made up of a plurality of segments, and which may be manufactured in almost any lengths by positioning a plurality of segments side-by-side, is described in European Patent No. 2 774 252 and U.S. Pat. No. 10,050,507. At the abutting surfaces between the segments, this linear motor includes overlapping regions, which are produced in such a manner, that the form-locked connection of the two segments results in an alignment of the segments with respect to each other. However, it is very expensive to machine the respective end regions of the segments with the necessary precision. In addition, very small inaccuracies may already result in gaps and edges, at which stray fields may leak out in an uncontrolled manner.

SUMMARY

Example embodiments of the present invention provide a segmented stator for a linear motor, which may be manufactured with a low amount of expenditure, but still allows effective shielding of stray fields at transitions from one segment to the next segment.

According to an example embodiment of the present invention, a segmented secondary part of a linear motor includes at least two segments, each segment including a yoke plate and a plurality of magnets attached to the yoke plate, the magnets having alternating polarity and having a direction of magnetization perpendicular to the yoke plate. The yoke plates include an overlapping region, in which the yoke plates of adjacent segments are superposed in the direction of magnetization, and the yoke plates do not touch each other in the overlapping region.

The overlapping region of two adjacent segments may include a projecting tongue on a first one of the two adjacent segments and a groove on a second one of the two adjacent segments, the tongue extending into the groove.

The tongue may be rectangular.

A clearance of at least 0.25 mm and/or at least 0.5 mm may be maintained between two adjacent segments and the respective yoke plates in all directions.

The clearance between the groove and the tongue in the direction of magnetization may be less than a clearance of longitudinal edges of two adjacent yoke plates in a direction perpendicular to the direction of magnetization, the longitudinal edges facing away from the magnets and being arranged oppositely to each other.

The longitudinal edges facing away from the magnets and arranged oppositely to each other may be beveled.

The bevel may have an angle in the range of 35° to 55°, e.g., 45°.

Each segment may have a first end including a projecting tongue and a second end including a groove, the overlapping region of each pair of adjacent segments including the tongue of a first segment extending into the groove of a second segment.

According to an example embodiment of the present invention, a linear motor includes a primary part and a segmented secondary part as described herein.

Two segmented secondary parts may be arranged opposite to each other, so that the magnets face each other and are located oppositely to each other with an identical direction of magnetization, the primary part being arranged as an ironless primary part movably guidable between the magnets.

In this manner, the requirements for the manufacturing precision of the segments of the secondary part are lowered, since their alignment is no longer produced by a form-locked connection in the overlapping region. On the contrary, screws and pins, which align and fix the individual segments in position on a machine, are used for this purpose.

The particular configuration of the overlapping region of the segments of the secondary part ensures that in the interior of the segments, the magnetic flux is transmitted across a small air gap in a concentrated manner, at a low magnetic resistance, while in regions of the segments situated further outwards, the air gap is larger, and the flux and, therefore, the leakage flux, as well, are smaller. By beveling the outer edges of the yoke plates facing away from the magnets and situated oppositely to each other, this magnetic resistance and, consequently, the escaping leakage flux, may be additionally reduced, here.

Further features and aspects of example embodiments of the present invention are described in more detail below with reference to the appended Figures.

DETAILED DESCRIPTION

Figure 1:
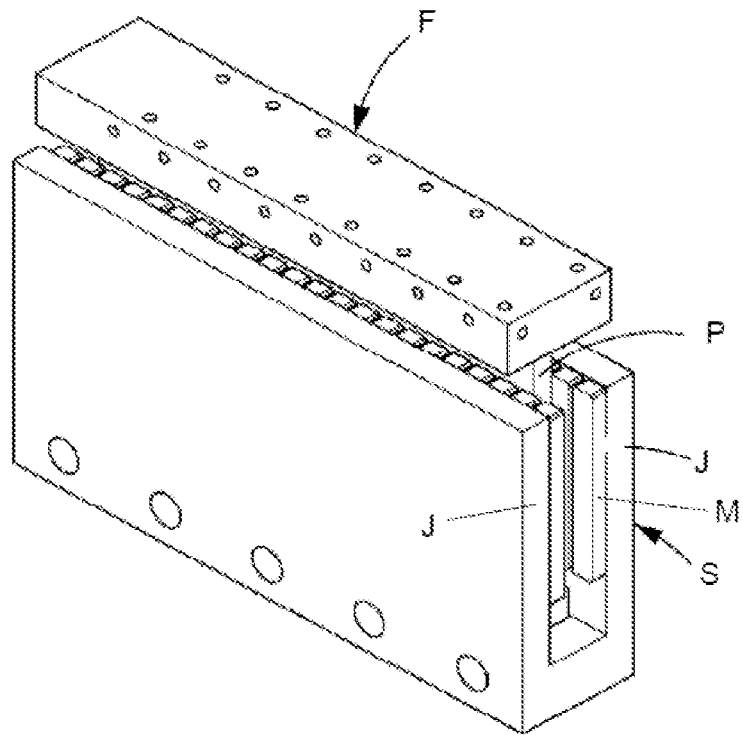
FIG. 1 illustrates a conventional linear motor.

FIG. 1 illustrates a conventional linear motor, with the aid of which a machine part may be moved and positioned relative to another machine part. A primary part P, which is connected to a mounting support F, moves between a secondary part S, which has two yoke plates J that are populated with magnets M. This mounting support F is connected to one of the two machine parts to be moved relative to each other, while secondary part S is connected to the other of the two machine parts. Magnets M have alternating polarity in the direction of movement of the linear motor; magnets positioned oppositely to each other are magnetized in the same direction. Coils, which are supplied with electrical energy via mounting support F, are situated in primary part P. If current flows through the coils, a force may be generated, which moves primary part P relative to the secondary part S having its yoke plates J and magnets M. The configuration illustrated in FIG. 1 is typical of ironless linear motors, as are often used for exact positioning. The positioning of magnets M on both sides increases the magnetic flux in the region of primary part P and, therefore, the force, which the linear motor may apply.

The configuration illustrated in FIG. 1 is also taken as a basis in the following exemplary embodiment of the present invention.

Figure 2:
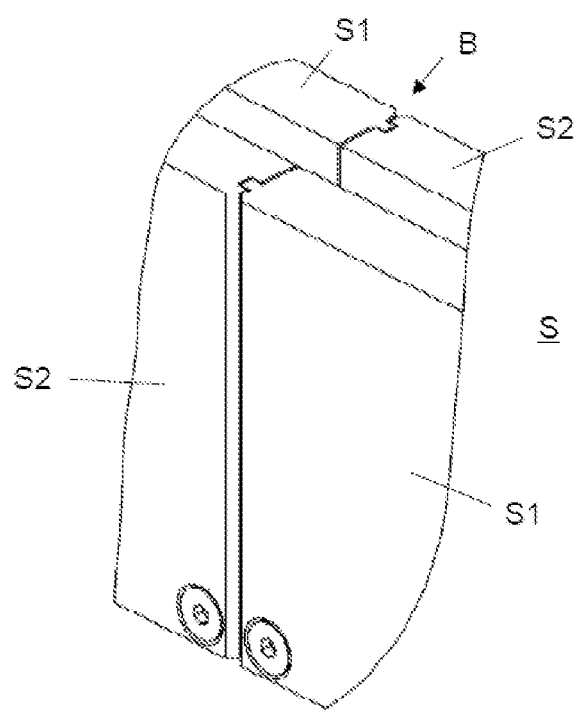
FIG. 2 is a perspective view of yoke plates of a secondary part.

FIG. 2 illustrates that a secondary part S may include a plurality of segments S1, S2. By positioning a plurality of segments S1, S2 side-by-side, secondary parts S of almost any length may be manufactured, without having to provide many different components for this purpose. Magnets M are arranged in each of segments S1, S2, as shown in FIG. 1.

Example embodiments of the present invention provide for the overlapping region B of, in each instance, two adjacent segments S1, S2. This region is illustrated in more detail in the FIGS. 3 and 4.

Figure 3:
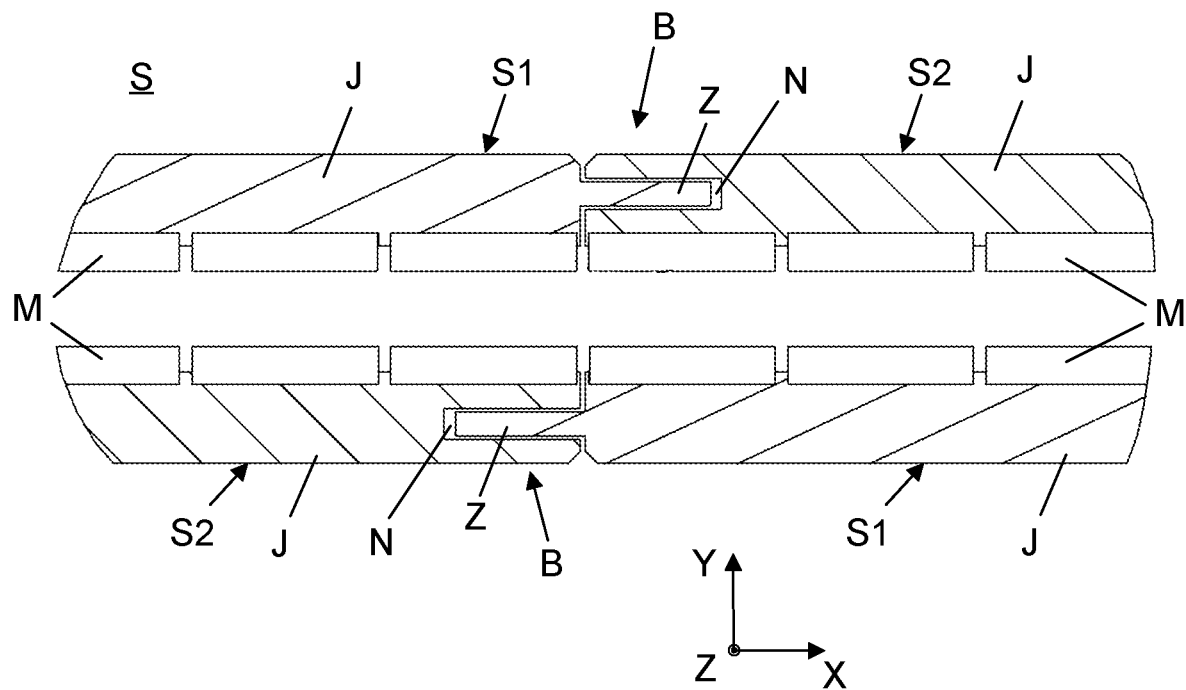
FIG. 3 is a cross-sectional view of segments of a secondary part.

FIG. 3 illustrates a section of secondary part S, the section including both direction of movement X of the primary part and direction of magnetization Y of magnets M. FIG. 3 illustrates overlapping regions B of, in each instance, two segments S1, S2 of segmented secondary part S.

As illustrated in FIG. 3, a first segment S1 has a tongue Z, which extends into a groove N of second segment S2. In this manner, yoke plates J of segments S1, S2 are superposed in overlapping region B; an outflow of leakage flux through a gap between the two segments S1, S2 is made more difficult.

Tongue Z and groove N may be, for example, rectangular, since this shape may be produced particularly easily. However, other shapes are also possible, for example, including triangular cross-sections in the X-Y section, or also a two-layer overlap, as in European Patent No. 2 774 252 and U.S. Pat. No. 10,050,507, mentioned above. Overlaps including two or more projections, which extend into corresponding recesses, are also within the spirit and scope hereof.

Figure 4:
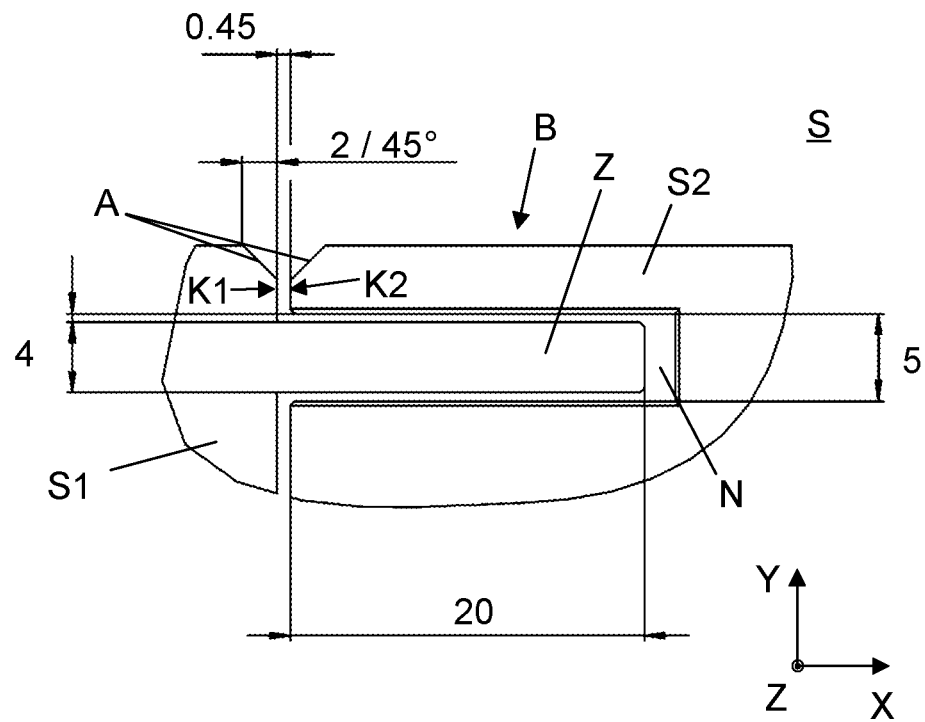
FIG. 4 is an enlarged view of the overlapping region between two segments.

As illustrated in FIG. 4, which is an enlarged view of overlapping region B, overlapping region B is not used for aligning segments S1, S2. On the contrary, segments S1, S2 do not touch each other, namely, neither in overlapping region B, nor otherwise. This means that, on one hand, tongue Z and groove N may be produced to have comparatively high tolerances and, therefore, inexpensively, and that on the other hand, segments S1, S2, are intended to be aligned with each other in another manner. The exact alignment is necessary, since the regular sequence of magnets M should also not be interfered with, in order to prevent unwanted force ripples. Segments S1, S2 may be positioned and fastened, for example, using pins and screws, which are guided through accurately aligned bore holes, into segments S1, S2 and in the machine part, or by limit stops present on the machine, by special mounting devices, etc.

FIG. 4 illustrates that the two segments S1, S2 maintain a minimum clearance of 0.5 millimeters in all directions X, Y. Even if a clearance that is as low as possible would be desirable for the magnetic flux, this minimum clearance should not fall below 0.25 mm, or else the manufacturing expenditure, that is, the necessary machining precision, increases unnecessarily. In the Y-direction, that is, in the direction of magnetization of magnets M, this clearance is less than the outer clearance of segments S1, S2 in the X-direction, since here, large surfaces (in the X-Z-plane) are formed by tongue Z and groove N in the interior of overlapping region B. Large surfaces having a low clearance have a lower magnetic resistance than smaller surfaces having a larger clearance, which means that the magnetic flux is concentrated in the interior of overlapping region B, and therefore, less leakage flux occurs in the surrounding area of segments S1, S2 of secondary part S. The clearance in the X-direction at the outer abutting surfaces between segments S1, S2 may be, for example, 0.75 millimeters.

This magnetic resistance at the outer edges K1, K2 extending in the Z-direction (which are still regarded as overlapping region B) may be increased even more, if the longitudinal edges K1, K2 of two adjacent yoke plates J each have a bevel A, which removes, e.g., in each instance, two millimeters of material in the X- and Y-directions and consequently forms a 45° angle; the longitudinal edges face away from magnets M and are situated oppositely to each other. A range of 35° to 55° for this bevel A is considered preferable. Since magnetic field lines always emerge perpendicularly to the surface, the path, which the magnetic flux must cover across the air gap, increases here, and with it, the magnetic resistance in the region of edges K1, K2 and/or of bevels A. Consequently, a greater portion of the flux is transmitted in the interior of overlapping region B, and the leakage flux is reduced.

The arrangements described herein are suitable for secondary parts S of ironless linear motors having a one-sided or, as shown, two-sided configuration of magnetic tracks, but also for secondary parts S of linear motors containing iron.

What is claimed is:

1. A segmented secondary part of a linear motor, comprising:
   at least two segments, each segment including a yoke plate and a plurality of magnets attached to the yoke plate, the magnets having alternating polarity and having a direction of magnetization perpendicular to the yoke plate;

wherein the yoke plates include an overlapping region, and the yoke plates of adjacent segments are superposed in the direction of magnetization;
wherein the yoke plates do not touch each other in the overlapping region;
wherein the overlapping region of two adjacent segments includes a projecting tongue on a first one of the two adjacent segments and a groove on a second one of the two adjacent segments, the tongue extending into the groove;
wherein a clearance of at least 0.25 mm is maintained between two adjacent segments and the respective yoke plates in all directions; and
wherein the clearance between the groove and the tongue in the direction of magnetization is less than a clearance of longitudinal edges of two adjacent yoke plates in a direction perpendicular to the direction of magnetization, the longitudinal edges facing away from the magnets and being arranged oppositely to each other.

2. The segmented secondary part according to claim 1, wherein the tongue is rectangular.

3. The segmented secondary part according to claim 1, wherein a clearance of at least 0.5 mm is maintained between two adjacent segments and the respective yoke plates on all directions.

4. The segmented secondary part according to claim 1, wherein the longitudinal edges facing away from the magnets and arranged oppositely to each other are beveled.

5. The segmented secondary part according to claim 4, wherein the bevel has an angle in the range of 35° to 55°.

6. The segmented secondary part according to claim 4, wherein the bevel has an angle of 45°.

7. The segmented secondary part according to claim 1, wherein each segment has a first end including a projecting tongue and a second end including a groove, the overlapping region of each pair of adjacent segments including the tongue of a first segment extending into the groove of a second segment.

8. A linear motor, comprising:
a primary part; and
a segmented secondary part including at least two segments, each segment including a yoke plate and a plurality of magnets attached to the yoke plate, the magnets having alternating polarity and having a direction of magnetization perpendicular to the yoke plate;
wherein the yoke plates include an overlapping region, and the yoke plates of adjacent segments are superposed in the direction of magnetization;
wherein the yoke plates do not touch each other in the overlapping region; and
wherein two segmented secondary parts are arranged opposite to each other, so that the magnets face each other and are located oppositely to each other with an identical direction of magnetization, the primary part being arranged as an ironless primary part movably guidable between the magnets.

9. The linear motor according to claim 8, wherein the overlapping region of two adjacent segments includes a projecting tongue on a first one of the two adjacent segments and a groove on a second one of the two adjacent segments, the tongue extending into the groove.

10. The linear motor according to claim 9, wherein the tongue is rectangular.

11. The linear motor according to claim 8, wherein a clearance of at least 0.25 mm is maintained between two adjacent segments and the respective yoke plates in all directions.

12. The linear motor according to claim 8, wherein a clearance of at least 0.5 mm is maintained between two adjacent segments and the respective yoke plates on all directions.

13. The linear motor according to claim 11, wherein the overlapping region of two adjacent segments includes a projecting tongue on a first one of the two adjacent segments and a groove on a second one of the two adjacent segments, the tongue extending into the groove; and
wherein the clearance between the groove and the tongue in the direction of magnetization is less than a clearance of longitudinal edges of two adjacent yoke plates in a direction perpendicular to the direction of magnetization, the longitudinal edges facing away from the magnets and being arranged oppositely to each other.

14. The linear motor according to claim 13, wherein the longitudinal edges facing away from the magnets and arranged oppositely to each other are beveled.

15. The linear motor according to claim 14, wherein the bevel has an angle in the range of 35° to 55°.

16. The linear motor according to claim 14, wherein the bevel has an angle of 45°.

17. The linear motor according to claim 8, wherein each segment has a first end including a projecting tongue and a second end including a groove, the overlapping region of each pair of adjacent segments including the tongue of a first segment extending into the groove of a second segment.

18. A linear motor, comprising:
a primary part; and
a segmented secondary part including at least two segments, each segment including a yoke plate and a plurality of magnets attached to the yoke plate, the magnets having alternating polarity and having a direction of magnetization perpendicular to the yoke plate;
wherein the yoke plates include an overlapping region, and the yoke plates of adjacent segments are superposed in the direction of magnetization;
wherein the yoke plates do not touch each other in the overlapping region;
wherein a clearance of at least 0.25 mm is maintained between two adjacent segments and the respective yoke plates in all directions;
wherein the overlapping region of two adjacent segments includes a projecting tongue on a first one of the two adjacent segments and a groove on a second one of the two adjacent segments, the tongue extending into the groove; and
wherein the clearance between the groove and the tongue in the direction of magnetization is less than a clearance of longitudinal edges of two adjacent yoke plates in a direction perpendicular to the direction of magnetization, the longitudinal edges facing away from the magnets and being arranged oppositely to each other.

19. The linear motor according to claim 18, wherein the longitudinal edges facing away from the magnets and arranged oppositely to each other are beveled.

* * * * *